United States Patent [19]

Gass

[11] Patent Number: 5,425,874
[45] Date of Patent: Jun. 20, 1995

[54] ROTATING CONTACTOR INCLUDING CROSS FLOW MEDIA FOR THE BIOLOGICAL TREATMENT OF WASTE WATER

[75] Inventor: Donald N. Gass, Brown Deer, Wis.

[73] Assignee: Envirex Inc., Waukesha, Wis.

[21] Appl. No.: 257,379

[22] Filed: Jun. 9, 1994

[51] Int. Cl.6 ............................................. C02F 3/08
[52] U.S. Cl. ................................. 210/150; 261/92
[58] Field of Search ...................... 210/150, 151, 619; 261/92

[56] References Cited

U.S. PATENT DOCUMENTS

| | | |
|---|---|---|
| 4,137,172 | 1/1979 | Sato et al. . |
| 4,268,385 | 5/1981 | Yoshikawa .................. 210/150 |
| 4,431,537 | 2/1984 | Hirota ........................ 210/150 |
| 4,441,452 | 4/1984 | Strain, Jr. .................... 261/92 |
| 4,468,326 | 8/1984 | Kawert ....................... 210/619 |
| 4,522,714 | 6/1985 | Thissen ...................... 210/150 |
| 4,532,035 | 7/1985 | Fuchs et al. ................. 210/150 |
| 4,549,962 | 10/1985 | Koelsch ..................... 210/150 |
| 4,668,387 | 5/1987 | Davie et al. ................. 210/150 |
| 5,256,570 | 10/1993 | Clyde ......................... 210/619 |

FOREIGN PATENT DOCUMENTS 2224275 5/1990 United Kingdom ............... 210/150

OTHER PUBLICATIONS

Rex Biological Contactors: for proven, cost-effective options in secondary treatment; Bulletin No. 315-1-3A/5 (Jun., 1989).

*Primary Examiner*—Thomas Wyse
*Attorney, Agent, or Firm*—Michael, Best & Friedrich

[57] ABSTRACT

A media panel for a rotating biological treatment apparatus for treating waste water, the rotating biological treatment apparatus including a rotatable shaft having a longitudinal axis and a plurality of media panel assemblies stacked on the shaft and each including a hub mounted on the shaft and a plurality of media panels mounted on the hub, the media panel comprising a planar member having a first side and a second side, and the planar member being mountable on the hub to extend normal to the longitudinal axis of the shaft to form a portion of a generally disk-shaped media panel assembly extending normal to the longitudinal axis of the shaft; the first side of the planar member including at least one first set of alternating grooves and ridges, and the second side of the media panel including at least one second set of alternating grooves and ridges; the grooves and ridges of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel is mounted on the hub.

15 Claims, 6 Drawing Sheets

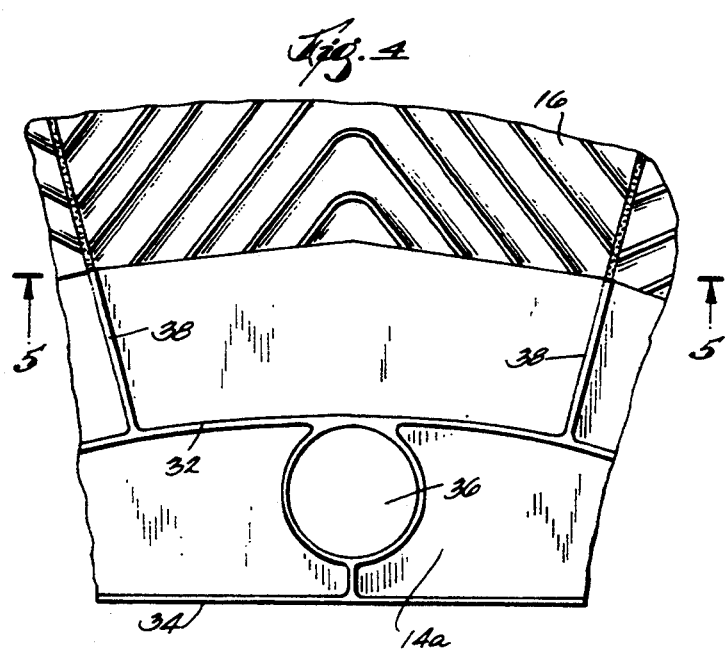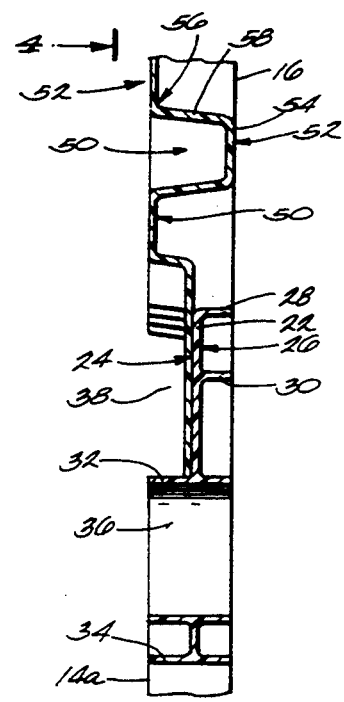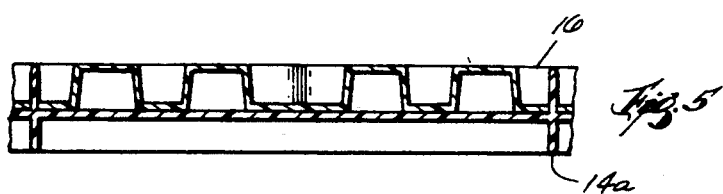

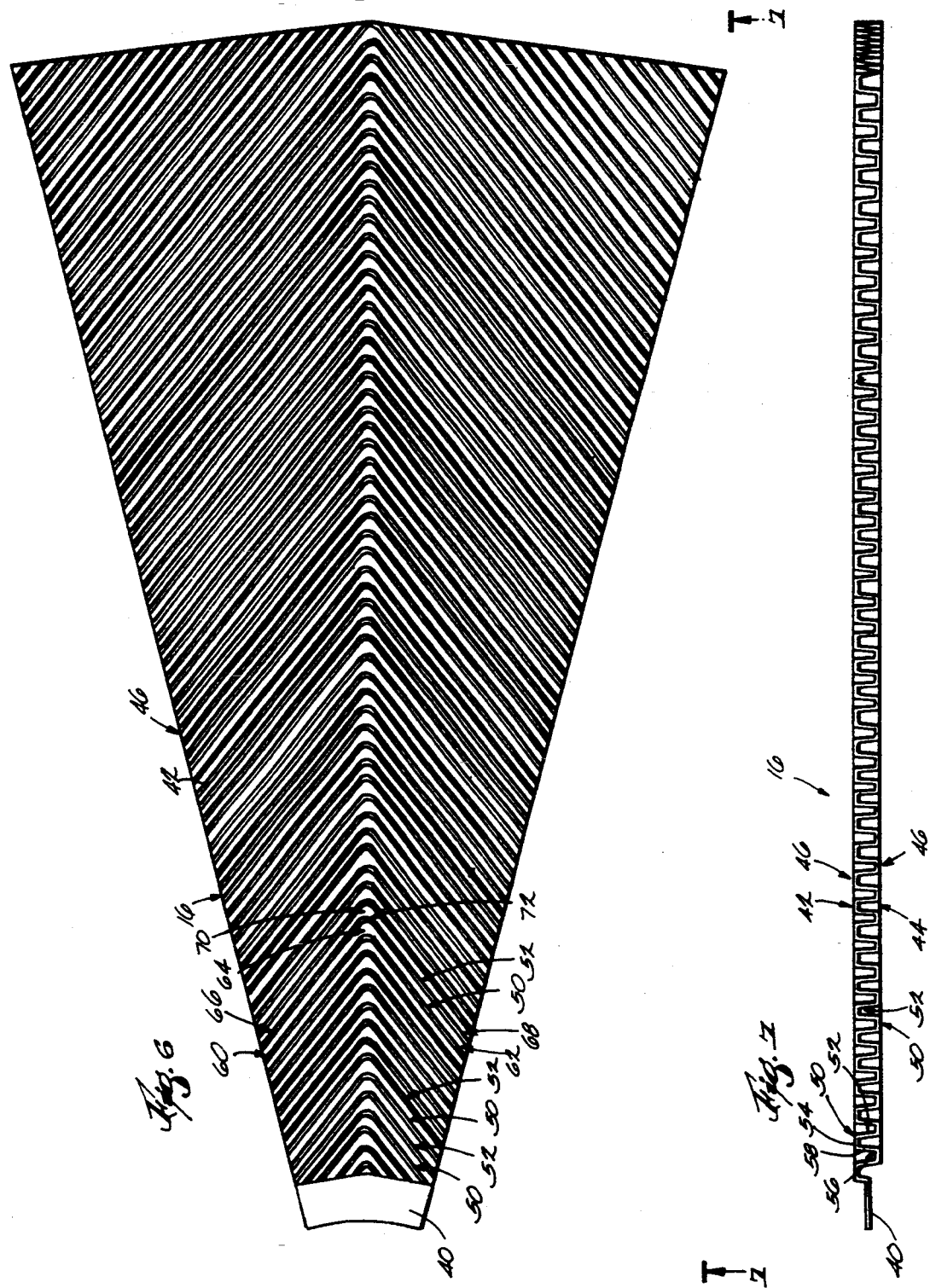

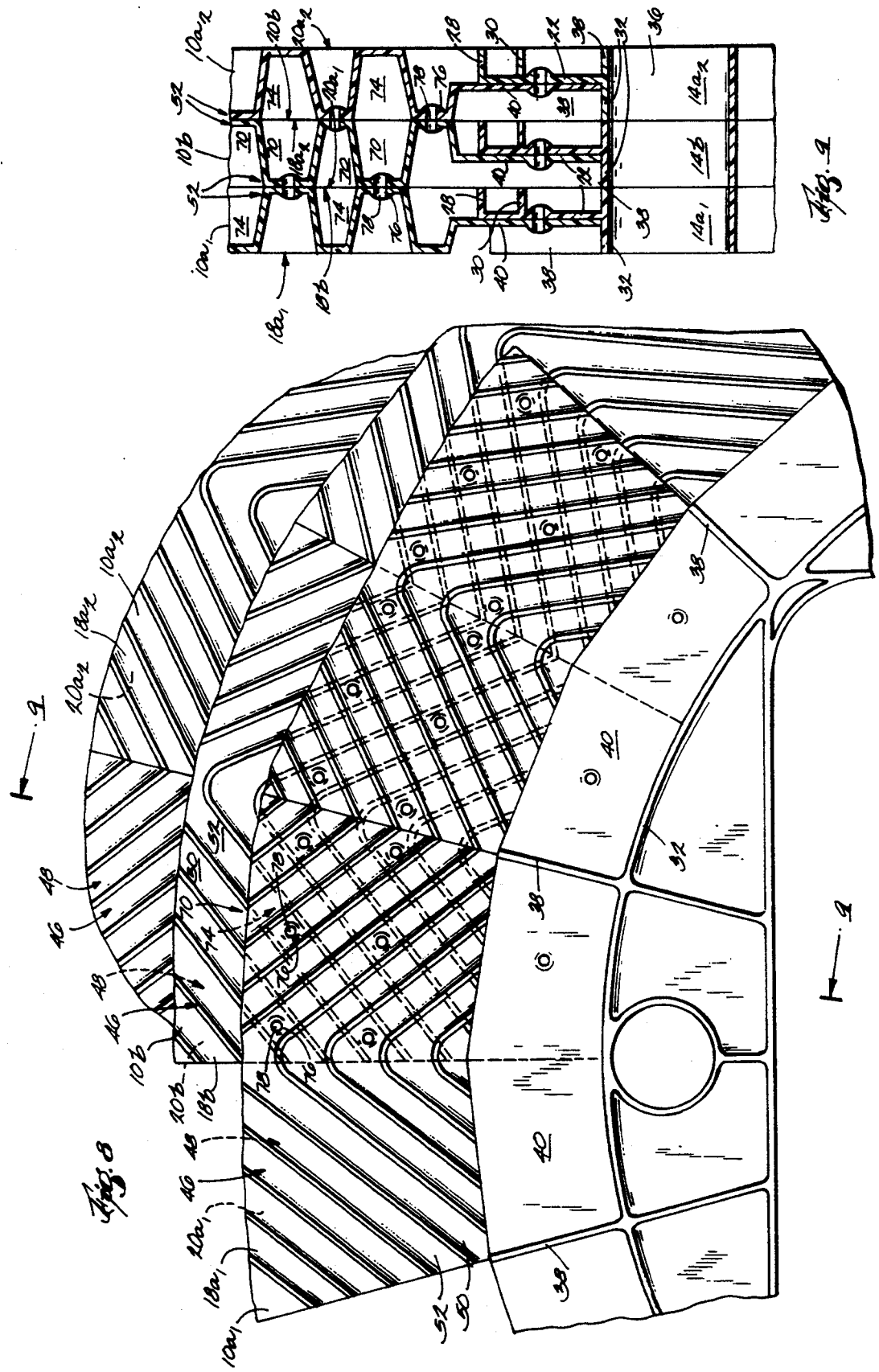

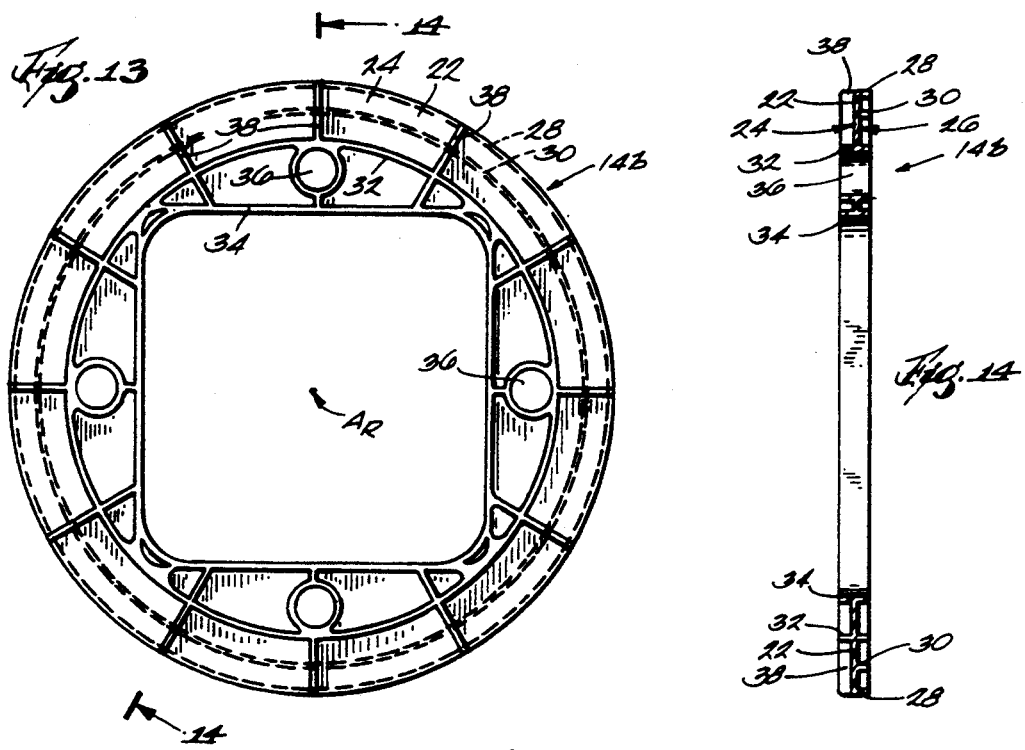
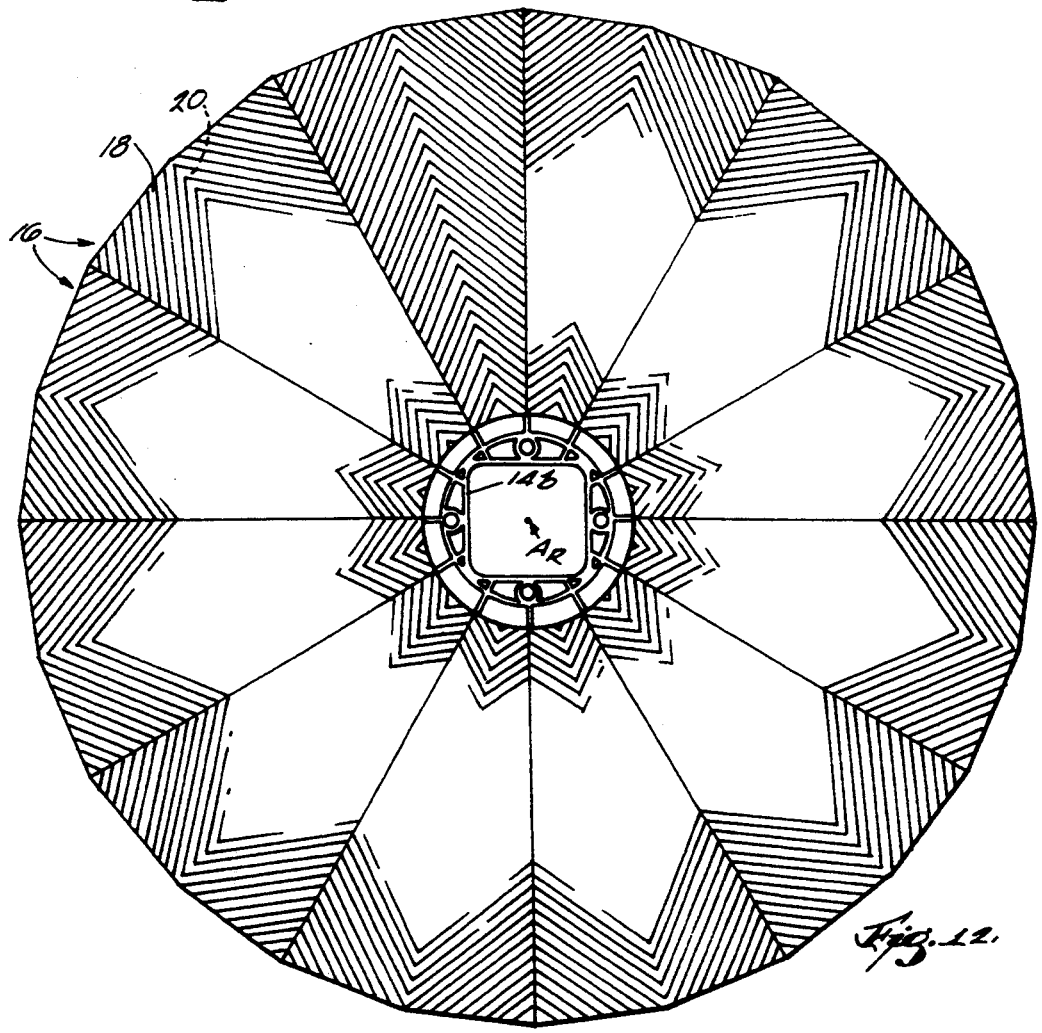

ROTATING CONTACTOR INCLUDING CROSS FLOW MEDIA FOR THE BIOLOGICAL TREATMENT OF WASTE WATER

BACKGROUND OF THE INVENTION

1. Field of the Invention

The invention relates to waste water treatment apparatus, and more particularly to rotating contactors for the biological treatment of waste water.

2. Reference to Prior Art

U.S. Pat. Nos. 4,137,172, 4,549,962, and 4,431,537 are illustrative of the general configuration of rotating contactors for the biological treatment of waste water. Typically, rotating biological contactors (RBCs) include a rotatable contactor mounted in a tank containing waste water. The lower portion of the contactor is submerged in the waste water and the upper portion is exposed to the atmosphere. The contactor is rotated to alternately expose portions of the contactor to the atmosphere and the waste water, thereby providing for the growth of biological organisms on surfaces in the contactor and treatment of the waste water by the organisms.

Rotatable contactors typically include a plurality of discs stacked on a horizontally extending, rotatable shaft. The discs typically are corrugated sheets of plastic, wherein the grooves and ridges defined by the corrugations are straight and thus define straight, unidirectional flow passages. The organisms grow on the disk surfaces defining the passages, and the waste water in the passages contacts the organisms.

SUMMARY OF THE INVENTION

A contactor constructed of corrugated plastic sheets as described above is relatively weak in the direction perpendicular to the aligned corrugations. As a result, the biomass loading capacity of such a contactor is limited. A contactor of the described construction also has a relatively low surface area concentration for contact between the waste water and organisms. Such a contactor also has a relatively low cross sectional open flow area in the flow passages. An additional flat sheet may be interlaid between adjacent corrugated sheets in order to improve the strength of the contactor, but using such interlay sheets decreases the cross sectional open flow area of the flow passages and thus increases the probability of plugging by solids. The interlay sheets also increase the amount of material required to construct the contactor, and require an additional stapling step for assembling the contactor.

Further, the water passes through each flow passage in a straight flow path and thus contacts the organisms in the passage for only a minimum contact period. Also because of the straight flow passages, there is relatively little mixing of waste water in the flow passages, and only limited shearing of the biomass by the waste water passing therethrough. As a result, the size and age of the biomass is relatively high and decreases the treatment efficiency of the contactor. This biomass shearing problem is more severe in the central region near the hub of the contactor, because of the low angular velocity of waste water in the central region of the contactor.

Another disadvantage of the described construction is that there is no positive radial component of flow through the media. A result is underloading of waste water in the central region, and a corresponding decrease in the treatment efficiency of the contactor. Radial passages can be provided to permit the waste water to enter the central region of the contactor. However, such radial passages further decrease the surface area concentration and do not improve other problems associated with the straight flow passages. Also, if the radial passages are formed into the media panels, the cross-sectional area of the radial passages is restricted and thus limits the amount of waste water provided to the central region of the contactor.

Rotatable contactors can be constructed from media other than corrugated plastic sheets in a manner different from that described above. Such contactors are typically constructed from a plurality of differently configured panels and additional parts, thus increasing the complexity of assembling and maintaining the contactor. Such contactors are not assembled into integral media structural assemblies, and instead require support members in addition to the media panels and hubs. Such contactors also typically have not been constructed using 360° welding machines. As a result of these factors, such contactors are relatively complex and expensive to construct and maintain.

The invention provides a rotating biological treatment apparatus including cross-flow media constructed from a plurality of identical media panels. The cross-flow media provides an elongated tortuous flow path and an increased contact period for waste water passing through the flow passages, increased mixing of the waste water and shearing of the biomass, and a positive radial component of flow providing waste water to the central region of the contactor.

The invention also provides a rotating biological treatment apparatus including cross-flow media having increased open flow area and surface area concentration.

The invention also provides a rotating biological treatment apparatus including cross-flow media having increased strength and biomass loading capacity.

The invention also provides a rotating biological treatment apparatus including cross-flow media including only hubs and media panels and constructed as integral media structural assembly on a conventional 360° welding machine.

More particularly, the invention provides a rotating biological treatment apparatus for treating waste water. The rotating biological treatment apparatus includes a tank, a contactor rotatably mounted in the tank, and driving means for rotating the contactor. The contactor includes a rotatable shaft and a plurality of generally circularly-shaped media panel assemblies stacked on the shaft. Each media panel assembly includes a hub mountable on the shaft and a plurality of media panels mounted on the hub to extend normal to the shaft. Sets of alternating V-shaped grooves and ridges on each side of the media panel assembly have different angular orientations about the shaft, so that each set of alternating grooves and ridges is angularly adjacent to other sets of alternating grooves and ridges. When stacked on the shaft, the first side of each media panel assembly abuts the first side of a first adjacent media panel assembly, and the second side of the media panel assembly abuts the second side of a second adjacent media panel assembly. Each of the sets of alternating grooves and ridges is offset at an angular orientation different from the abutting sets of alternating grooves and ridges, such that a primary flow passage is defined between each groove and a plane extending across the ridges of the abutting side, a plurality of cross-flow passages crossing each primary flow passage are defined between the grooves of the abutting side, and each primary flow passage is in open fluid communication with the cross-flow passages.

Each media panel comprises a planar member, which preferably is a sheet of corrugated plastic, having a first side and a second side. Each side of the planar member includes at least one set of alternating grooves and ridges. The grooves and ridges, which preferably are V-shaped, each have a first radially inner portion, a second radially inner portion spaced apart from the first radially inner portion, and a radially outer portion between and spaced radially outwardly with respect to the first and second radially inner portions when the media panel is mounted on the hub.

Other features and advantages of the invention are described in the following drawings, detailed description and claims.

BRIEF DESCRIPTION OF THE DRAWINGS

FIG. 3 is a partial cross-sectional view taken generally along line 3—3 in FIG. 2.

FIG. 4 is a partial front view taken generally along line 4—4 in FIG. 3.

FIG. 5 is a sectional view taken generally along line 5—5 in FIG. 4.

FIG. 6 is an enlarged front elevational view of one of the media panels shown generally in FIG. 2.

FIG. 7 is a side view taken generally along line 7—7 in FIG. 6.

FIG. 8 is an enlarged partial view of the first media panel assembly shown generally in FIG. 2, and is broken away to show adjacent media panel assemblies.

FIG. 9 is a cross-sectional view taken generally along line 9—9 in FIG. 8.

FIG. 12 is a front elevational view similar to FIG. 2, showing a second media panel assembly included in the contactor shown in FIG. 1.

FIG. 13 is an enlarged side elevational view of the second hub shown generally in FIG. 12.

FIG. 14 is a cross-sectional view taken generally along line 14—14 in FIG. 13.

DETAILED DESCRIPTION OF A PREFERRED EMBODIMENT

Figure 1:
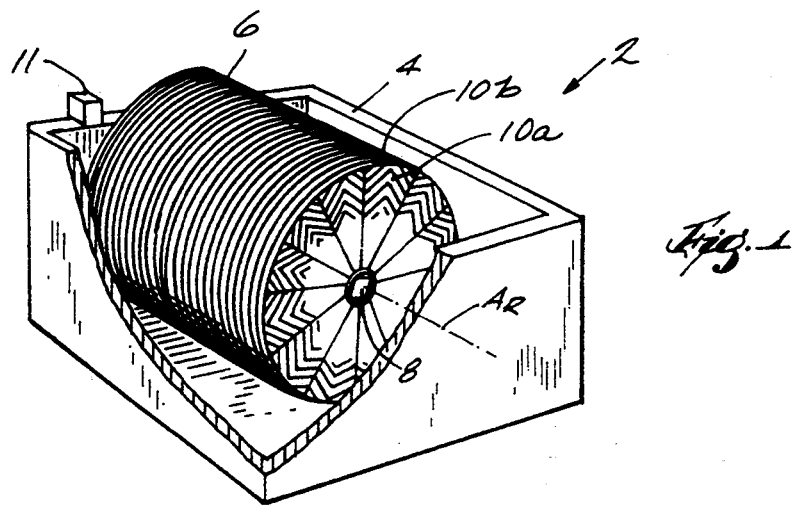
FIG. 1 is a perspective view of a rotating biological treatment apparatus of the invention.

FIG. 1 illustrates a rotating biological treatment apparatus 2 of the invention. The rotating biological treatment apparatus 2 includes a tank 4 for containing a liquid to be treated and a contactor 6 rotatably mounted in the tank 4. The contactor 6 includes a horizontal shaft 8 having a horizontal axis of rotation $A_R$. A plurality of generally circularly shaped first and second media panel assemblies 10a and 10b are integrally welded together and stacked on the shaft 8 for rotation through the waste water, such that a plurality of flow passages (described below) are defined between adjacent media panel assemblies 10a and 10b. The apparatus 2 also includes driving means 11 for rotating the contactor 6 in the tank 4.

Each generally circularly-shaped first or second media panel assembly 10a or 10b (see FIGS. 2 and 12) includes a respective circular hub 14a or 14b mountable on the shaft 8 and a plurality of media panels 16 mounted on each hub 14a or 14b to extend normal to the axis $A_R$ of the shaft 8. Each media panel assembly 10a or 10b has opposed first and second sides 18 and 20.

Except as otherwise described, the first and second hubs 14a and 14b are identical, and only the first hub 14a will be described in full detail. The first hub 14a (see FIGS. 2-5 and 10-11) is a generally flat, disk-shaped member including an outer edge portion 22. The outer edge portion 22 extends perpendicular to the axis $A_R$ of the shaft 8 for receiving the media panels 16, as further described below. The outer edge portion 22 includes opposed front and rear surfaces 24 and 26. The first hub 14a also includes outer and inner reinforcing flanges 28 and 30 extending perpendicular to the rear surface 26 of the outer edge portion 22. Thus, the outer reinforcing flange 28 defines a circular, axially extending wall at the outer periphery of the hub 14a, and the inner reinforcing flange 30 defines a circular, axially extending wall spaced radially inwardly from the outer reinforcing flange 28. The outer and inner reinforcing flanges 28 and 30 prevent the outer edge portion 22 from flexing excessively when the media panels 16 are mounted thereon. The first hub 14a also includes an intermediate flange 32 extending perpendicularly to the outer edge portion 22 and defining a circular, axially extending wall spaced radially inwardly from the inner reinforcing flange 30. Thus, the outer edge portion 22 terminates at the circular wall defined by the intermediate flange 32. The first hub 14a also includes an inner flange 34 spaced radially inwardly from the intermediate flange 32. The inner flange 34 extends perpendicularly to the outer edge portion 22 and defines a square opening for receiving the shaft 8, which has a corresponding square cross-section. The first hub 14a also includes flanges defining four apertures 36. The apertures 36 are spaced around the square opening defined by the inner flange 34 for handling the hub during assembly of the media panel assembly and contactor. The first hub 14a also includes twelve radial positioning flanges 38 each extending perpendicularly to the outer edge portion 22 for positioning the media panels 16 around the outer edge portion 22 as further described below. The radial positioning flanges 38 are equally spaced and thus divide the outer edge portion 22 into twelve 30° sectors for receiving respective media panels 16 as described below. On the second hub 14b, the radial positioning flanges 38 are also equally spaced and divide the outer edge portion 22 into twelve 30° sectors, but the position of each radial positioning flange 38 is offset 15° from the position of the corresponding flanges 38 on the first hub 14a. Thus, when the first and second hubs 14a and 14b are aligned on the square shaft 8, the 30° sectors on the first hub 14a are offset 15° from the sectors on the second hub 14b.

In the illustrated embodiment of the invention, each media panel 16 (see FIGS. 6 and 7) is a 30° wedge-shaped planar member. Twelve media panels 16 (see FIG. 2) are mounted on each hub 14a or 14b and extend normal to the axis $A_R$ of the shaft 8 to form a generally circular media panel assembly 10a or 10b. Thus, each media panel 16 forms a wedge-shaped portion of a media panel assembly 10a or 10b. Each media panel 16 includes an inner flange portion 40 for mounting against the front surface 24 of the outer edge portion 22 of a hub 14a or 14b. The inner flange portion 40 is positioned between a pair of the radial positioning flanges 38 on the outer edge portion 22 of the hub and is mounted against the outer edge portion 22 by a plurality of plastic welds. Each media panel 16 includes opposed first and second sides 42 and 44 (only the first side 42 is shown in FIG. 6). Each of the first and second sides 42 or 44 includes a respective first or second set 46 or 48 of alternating grooves 50 and ridges 52. In other embodiments (not shown), each media panel 16 can include more than one set 46 or 48 of alternating grooves and ridges on each side 42 or 44 thereof. Although the media panels 16 can be constructed in any suitable manner, in the illustrated embodiment each media panel 16 is formed by corrugating a sheet of plastic to form the alternating grooves 50 and ridges 52 on the opposed sides 42 and 44 thereof. Thus, the sides 42 and 44 of each media panel 16 are mirror images of each other.

In cross section (see FIGS. 3 and 7), each ridge 52 has a top portion 54, a bottom portion 56, and sides 58 having a pitch and an angle. In the illustrated embodiment (see FIG. 5), the ridges 52 have a generally trapezoidal cross-sectional profile, wherein each ridge 52 is narrower at the top portion 54 thereof than at the bottom portion 56 thereof, so that the sides 58 of each ridge 52 are angled slightly outwardly from the top portion 54 to the bottom portion 56. It should be understood that the grooves 50 have a trapezoidal cross-section similar to the ridges 52.

Along the length or extent thereof, each groove 50 (see FIG. 6) has a first radially inner portion 60, a second radially inner portion 62 spaced apart from the first radially inner portion 60, and a radially outer portion 64 between and spaced radially outwardly with respect to the first and second radially inner portions 60 and 62 when the respective media panel assembly 10a or 10b is mounted on the shaft 8. Similarly, each ridge 52 has a first radially inner portion 66, a second radially inner portion 68 spaced apart from the first radially inner portion 66, and a radially outer portion 70 between and spaced radially outwardly with respect to the first and second radially inner portions 66 and 68. In the illustrated embodiment, the grooves 50 and ridges 52 are generally V-shaped and include a curved transition portion 72 at the apex of the legs of the "V". A 75° included angle is defined between the legs of the "V" of each groove 50 and ridge 52. In other embodiments of the invention, the grooves 50 and ridges 52 can be configured differently, such as U-shaped.

Figure 2:
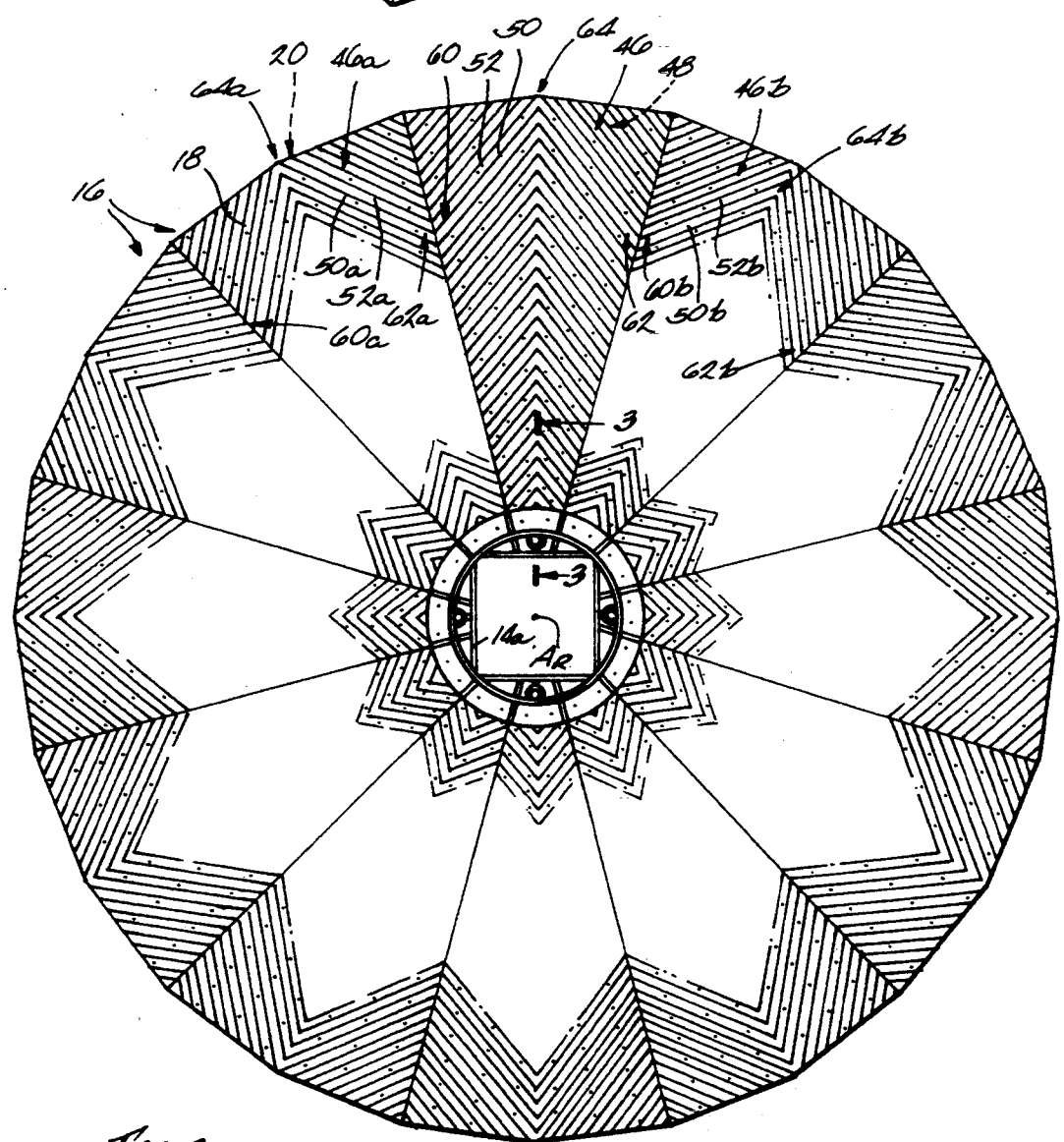
FIG. 2 is a front elevational view of a first media panel assembly included in the contactor shown in FIG. 1.

The first and second sides 18 and 20 of each media panel assembly 10a or 10b are mirror images of each other. The first side 18 (see FIG. 2) includes twelve of the first sets 46 of alternating grooves 50 and ridges 52, and the second side 20 includes twelve of the second sets 48 of alternating grooves 50 and ridges 52. Since the first and second sides 18 and 20 are mirror images, only the first side 18 will be described in detail. On the first side 18, each of the first sets 46 of alternating V-shaped grooves 50 and ridges 52 occupies a different angular position and thus has a different angular orientation about the shaft 8 and longitudinal axis $A_R$. As shown in FIG. 2, each first set 46 of alternating grooves 50 and ridges 52 is angularly adjacent to a first angularly adjacent set 46a and a second angularly adjacent set 46b of alternating grooves 50a and 50b and ridges 52a and 52b, respectively, in the order 46a, 46 and 46b. The grooves 50, 50a and 50b each include a respective first radially inner portion 60, 60a or 60b, second radially inner portion 62, 62a or 62b, and radially outer portion 64, 64a or 64b. Although different alignments between the grooves 50, 50a and 50b in adjacent sets 46, 46a and 46b are possible, in the illustrated embodiment each groove 50 in each first set 46 is aligned at the first radially inner portion 60 with the second radially inner portion 62a of a groove 50a in the first angularly adjacent set 46a, and is aligned at the second radially inner portion 62 with the first radially inner portion 60b of a groove 50b in the second angularly adjacent set 46b. It should be understood that the ridges 52 in each set 46 are aligned with the ridges 52a and 52b in the respective first and second angularly adjacent sets 46a and 46b in a similar manner.

Each first media panel assembly 10a is stacked on the shaft 8 between a pair of axially adjacent second media panel assemblies 10b, and each second media panel assembly 10b is stacked on the shaft 8 between a pair of axially adjacent first media panel assemblies 10a. The stacking arrangement will be described in connection with a second media panel assembly 10b (see FIGS. 8 and 9) stacked between a pair of adjacent first media panel assemblies 10a. For purposes of description, the adjacent first media panel assemblies 10a are identified as a first adjacent media panel assembly $10a_1$, and a second adjacent media panel assembly $10a_2$, respectively. Thus, the media panel assemblies are stacked in the order $10a_1$, 10b and $10a_2$. Each of the media panel assemblies $10a_1$, 10b and $10a_2$ includes a respective hub $14a_1$, 14b or $14a_2$, first side $18a_1$, 18b or $18a_2$ and second side $20a_1$, 20b or $20a_2$. The second side $20a_1$ (see FIGS. 8 and 9) of the first adjacent media panel assembly $10a_1$ abuts the first side 18b of the second media panel assembly 10b, and the first side $18a_2$ of the second adjacent media panel assembly $10a_2$ abuts the second side 20b of the second media panel assembly 10b. Abutting sets 46 and 48 of alternating grooves 50 and ridges 52 on the abutting sides of the media panel assemblies $10a_1$, 10b and $10a_2$ are offset 15° (an amount equal to one half of the 30° angular extent of each set 46 of alternating grooves 50 and ridges 52) from each other. Thus, each of the first sets 46 of alternating grooves 50 and ridges 52 on the first side 18b of the second media panel assembly 10b occupies an angular position offset by 15° from the abutting second sets 48 of alternating grooves 50 and ridges 52 on the second side $20a_1$ of the first adjacent media panel assembly $10a_1$. Similarly, each of the second sets 48 of alternating grooves 50 and ridges 52 on the second side 20b of the second media panel assembly 10b is at an angular orientation offset by 15° from the abutting first sets 46 of alternating grooves 50 and ridges 52 on the first side $18a_2$ of the second adjacent media panel assembly $10a_2$.

Primary flow passages 70 are defined between each groove 50 on the first side 18b of the second media panel assembly 10b and a plane extending across the top portions 54 of the ridges 52 of the respective abutting side $20a_1$, of the first adjacent media panel assembly $10a_1$. Similarly, primary flow passages 70 are also defined between each groove 50 on the second side 20b of the second media panel assembly 10b and a plane extending across the top portions 54 of the ridges 52 of the respective abutting side $18a_2$ of the second adjacent media panel assembly $10a_2$. A plurality of cross-flow passages 74 crossing and in open communication with each primary flow passage 70 are defined between the grooves 50 on the respective abutting side $20a_1$ or $18a_2$ of the first or second adjacent media panel assembly $10a^1$ or $10a_2$ and a plane extending across the top portions 54 of the ridges 52 on the respective abutting first or second side 18a or 18b of the second media panel assembly 10b. Each cross-flow passage 74 extends at a 90° angle to each primary flow passage 70 crossed thereby. The passages crossing at 90° angles minimize the area of overlap between the abutting top portions 54 of abutting ridges 52, and maximizes the surface area of the primary and crossflow passages 70 and 74 which is available for biological growth. Thus, waste water passes in a generally chordal direction through each primary flow passage 70, and passes in radial and axial directions from each primary flow passage 70 into the cross-flow passages 74. It should be understood that primary flow passages 70 and cross-flow passages 74 are defined with respect to the grooves 50 on each side 18 and 20 of each media panel assembly 10a and 10b in the contactor 6.

In other embodiments (not shown) of the invention, the media panel assemblies can be stacked differently, such as with flat interlay sheets separating adjacent media panel assemblies. In other embodiments (not shown), the media panel assemblies can utilize a single hub 14a or 14b providing identical angular orientations for the abutting sets 46 and 48 of alternating grooves 50 and ridges 52 on adjacent media panel assemblies, and thereby avoid a cross-flow media configuration.

Each media panel assembly 10a and 10b is joined to adjacent media panel assemblies by a plurality of plastic welds 76 at the top portions 54 of the abutting ridges 52. As shown in FIGS. 8 and 9, each weld 76 defines an aperture 78 through the top portions 54 of the abutting ridges 52 of the media panel assemblies 10a and 10b. Preferably, the media panel assemblies 10a and 10b are welded together in a 360° welding machine. A plurality of the stacked, welded media panel assemblies 10a and 10b defines an integral media structural assembly including only a plurality of the first and second hubs 14a and 14b and media panels 16. The integral media structural assembly is mounted on the shaft 8 without additional support members.

Although in the illustrated embodiment the contactor 6 includes a single integral structural assembly of stacked media panels, in other embodiments (not shown) of the invention the contactor 6 can include a plurality of media packs stacked on the shaft 8, wherein each media pack is an integral media structural assembly including from about 10 to about 50 media panel assemblies welded together. The media packs are assembled together with other media packs to form an integral media structural assembly extending along the entire length of the contactor shaft 8.

In operation, each V-shaped primary flow passage cooperates with angularly adjacent V-shaped primary flow passages on the same media panel assembly and with cross-flow passages on the abutting media panel assembly to provide an elongated, tortuous flow path for waste water passing through the flow passage. As a result, there is a relatively long period of contact between waste water passing through the flow passages and the organisms growing on the sides of the media panel assemblies. There is also a high degree of mixing of the waste water and shearing of the biomass by the waste water passing through the flow passages. There is also a positive radial component of flow through the cooperating primary and cross-flow passages, which provides waste water to the central region of the contactor. The flow passages have a relatively high open flow area and provide a high surface area concentration in the contactor. The cross-flow media includes only hubs and media panels and is constructed as an integral media structural assembly having high strength and biomass loading capacity. The cross-flow media can be constructed on a conventional 360° welding machine. The combination of these factors provides a contactor having an increased treatment efficiency and which can be constructed and maintained with minimal complexity and expense.

Figure 15:
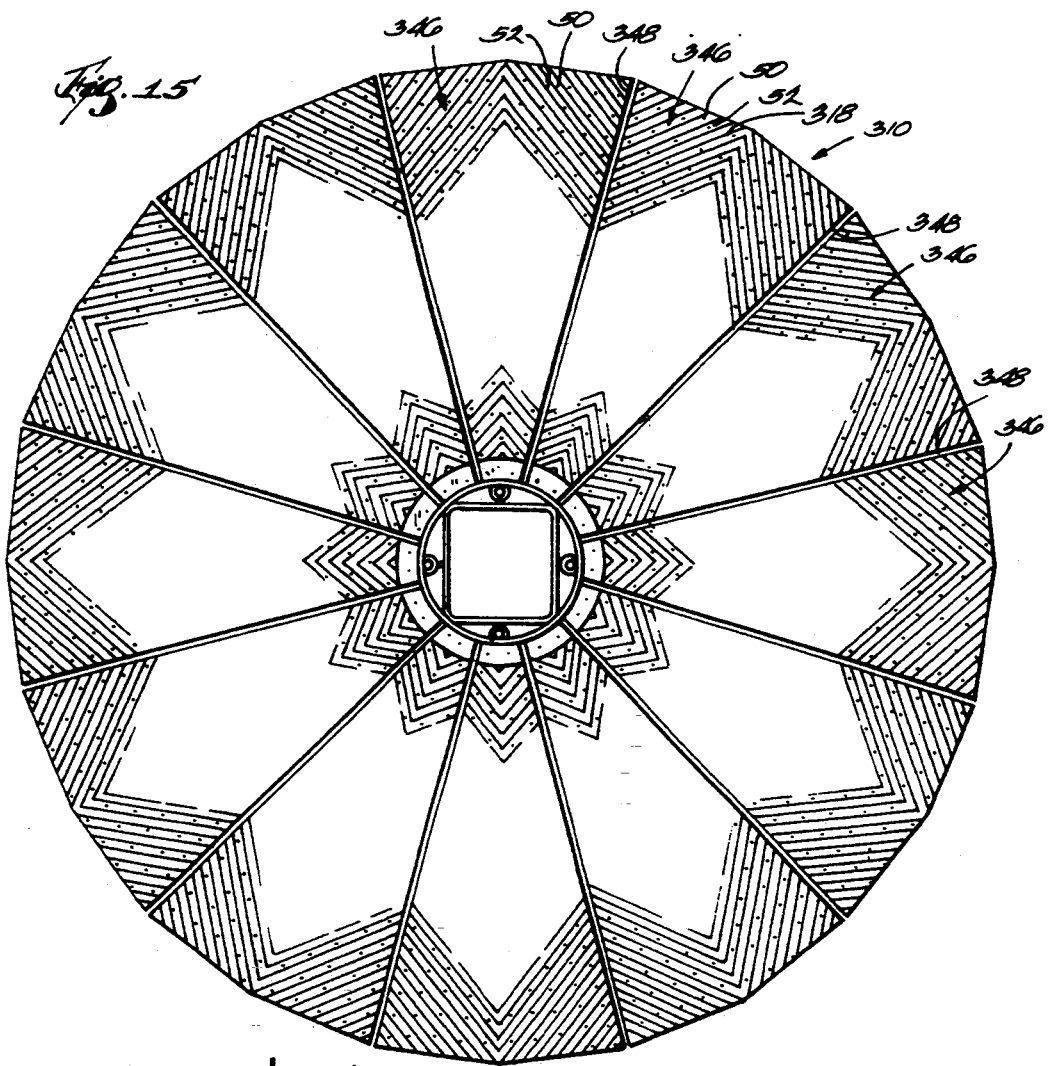
FIG. 15 is a front elevational view similar to FIG. 2, showing a media panel assembly in an alternative embodiment of the invention.
Figure 10:
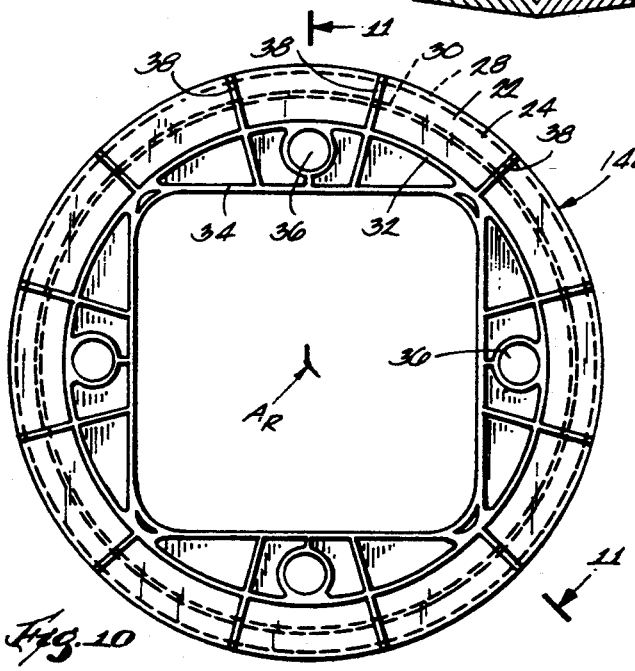
FIG. 10 is an enlarged side elevational view of the first hub shown generally in FIG. 2.
Figure 11:
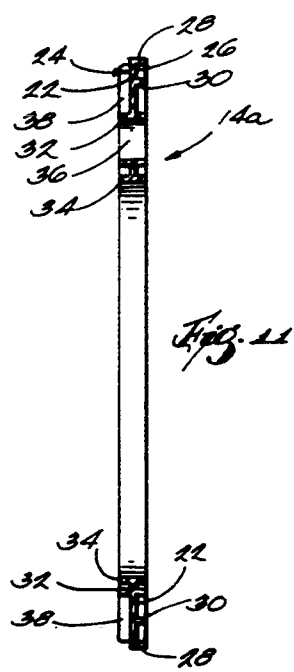
FIG. 11 is a cross-sectional view taken generally along line 11—11 in FIG. 10.

Illustrated in FIG. 15 is a media panel assembly 310 in a second embodiment of the invention. The media panel assembly 310 includes twelve radially extending passages 348. A passage 348 separates each first set 346 of alternating grooves 50 and ridges 52 from each angularly adjacent first set 346 of alternating grooves 50 and ridges 52 on the first side 318. It should be understood that the passages 348 also separate each set (not shown) of alternating grooves and ridges from each angularly adjacent set of alternating grooves and ridges on the second side of the media panel assembly. Water flows radially inwardly and outwardly through, and may also flow across, each radially extending passage 348.

I claim:

1. A media panel for a rotating biological treatment apparatus for treating waste water, the rotating biological treatment apparatus including a rotatable shaft having a longitudinal axis and a plurality of media panel assemblies stacked on the shaft and each including a hub mounted on the shaft and a plurality of media panels mounted on the hub, said media panel comprising:

a planar member having a first side and a second side, the planar member being mountable on the hub to extend normal to the longitudinal axis of the shaft to form a portion of a generally disk-shaped media panel assembly extending normal to the longitudinal axis of the shaft;

the first side of the planar member including at least one first set of alternating grooves and ridges, and the second side of the media panel including at least one second set of alternating grooves and ridges;

the grooves of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel is mounted on the hub; and the ridges of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel is mounted on the hub.

2. The media panel according to claim 1 and wherein each groove and ridge is generally V-shaped.

3. The media panel according to claim 1 and wherein the planar member is a sheet of plastic corrugated to form the grooves and ridges.

4. A media panel assembly for a rotating biological treatment apparatus for treating waste water, the rotating biological treatment apparatus including a rotatable shaft having a longitudinal axis and a plurality of media panel assemblies stacked on the shaft, each media panel assembly comprising:

a hub mountable on the shaft;

a plurality of media panels mountable on the hub to extend normal to the longitudinal axis of the shaft to form a generally disk-shaped media panel assembly extending normal to the longitudinal axis of the shaft, each media panel assembly having a first side and a second side;

the first side of the media panel assembly including a plurality of first sets of alternating grooves and ridges, and the second side of the media panel assembly including a plurality of second sets of alternating grooves and ridges;

the grooves of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

the ridges of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

each first and second set of alternating grooves and ridges having a different angular orientation about the longitudinal axis when the media panel assembly is mounted on the shaft, so that each set of alternating grooves and ridges is angularly adjacent to first angularly adjacent and second angularly adjacent sets of alternating grooves and ridges;

each groove in each set of alternating grooves and ridges connecting at the first radially inner portion to the second radially inner portion of a groove in the first angularly adjacent set of alternating grooves and ridges; and each groove in each set of alternating grooves and ridges connecting at the second radially inner portion to the first radially inner portion of a groove in the second angularly adjacent set of alternating grooves and ridges.

5. The media panel assembly according to claim 4 and wherein each groove and ridge is generally V-shaped.

6. The media panel assembly according to claim 4 and wherein the media panels are sheets of plastic corrugated to form the grooves and ridges.

7. A media panel assembly for a rotating biological treatment apparatus for treating waste water, the rotating biological treatment apparatus including a rotatable shaft having a longitudinal axis and a plurality of media panel assemblies stacked on the shaft, said media panel assembly comprising:

a hub mountable on the shaft;

a plurality of media panels mountable on the hub to extend normal to the longitudinal axis of the shaft to form a generally disk-shaped media panel assembly extending normal to the longitudinal axis of the shaft;

each media panel assembly having a first side and a second side;

the first side of the media panel assembly including a plurality of first sets of alternating grooves and ridges, and the second side of the media panel assembly including a plurality of second sets of alternating grooves and ridges;

the grooves of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

the ridges of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

each first and second set of alternating grooves and ridges having a different angular orientation about the longitudinal axis when the media panel assembly is mounted on the shaft, so that each set of alternating grooves and ridges is angularly adjacent to first angularly adjacent and second angularly adjacent sets of alternating grooves and ridges; and each groove in each set of alternating grooves and ridges connecting at the first radially inner portion to a radially extending passage and at the second radially inner portion to another radially extending passage, so that each set of alternating grooves and ridges is separated from each first angularly adjacent and second angularly adjacent set of alternating grooves and ridges by a radially extending passage.

8. The media panel assembly according to claim 7 and wherein each groove and ridge is generally V-shaped.

9. The media panel assembly according to claim 7 and wherein the media panels are sheets of plastic corrugated to form the grooves and ridges.

10. A rotating biological treatment apparatus for treating waste water, said apparatus comprising a tank for containing a waste water to be treated;

a contactor rotatably mounted in the tank, the contactor including a shaft having a longitudinal axis and a plurality of generally disk-shaped media panel assemblies stacked on the shaft to extend normal to the longitudinal axis of the shaft;

driving means for rotating the contactor;

each media panel assembly including a hub mounted on the shaft and a plurality of media panels mounted on the hub to extend normal to the longitudinal axis of the shaft, and each media panel assembly including first and second sides;

the first side of each media panel assembly including a plurality of first sets of alternating grooves and ridges, and the second side of the media panel assembly including a plurality of second sets of alternating grooves and ridges;

the grooves of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

the ridges of the first and second sets of alternating grooves and ridges each having a first radially inner portion, a second radially inner portion spaced apart from the first radially inner portion, and a radially outer portion between and spaced radially outwardly with respect to the first and second radially inner portions when the media panel assembly is mounted on the shaft;

each set of alternating grooves and ridges having a different angular orientation about the longitudinal axis when the media panel assembly is mounted on the shaft, so that each set is angularly adjacent to first angularly adjacent and second angularly adjacent sets of alternating grooves and ridges;

each groove in each set of alternating grooves and ridges connecting at the first radially inner portion to the second radially inner portion of a groove in the first angularly adjacent set of alternating grooves and ridges; and each groove in each set of alternating grooves and ridges connecting at the second radially inner portion to the first radially inner portion of a groove in the second angularly adjacent set of alternating grooves and ridges.

11. The apparatus according to claim 10 and wherein the plurality of media panel assemblies stacked on the shaft includes a first adjacent media panel assembly abutting the first side of each media panel assembly and a second adjacent media panel assembly abutting the second side of each media panel assembly;

each media panel assembly is stacked on the shaft with the first side abutting the second side of the first adjacent media panel assembly, and with the second side abutting the first side of the second adjacent media panel assembly; and wherein a primary flow passage is defined between each groove and a plane extending across the ridges of the abutting side, and a plurality of cross-flow passages crossing and in open communication with the primary flow passage is defined between the grooves of the abutting side and a plane extending across the ridges.

12. The apparatus according to claim 11 and wherein the cross-flow passages cross the primary flow passage at 90° angles.

13. The apparatus according to claim 10 and wherein each groove and ridge is generally V-shaped.

14. The apparatus according to claim 10 and wherein the media panels are sheets of plastic corrugated to form the grooves and ridges.

15. The apparatus according to claim 10 and wherein the adjacent media panel assemblies are joined at abutting ridges by a plurality of plastic welds.

* * * * *